Aug. 26, 1969  E. McINERNEY  3,463,253
WEDGE ORIENTATION DEVICE
Filed April 3, 1967  2 Sheets-Sheet 1
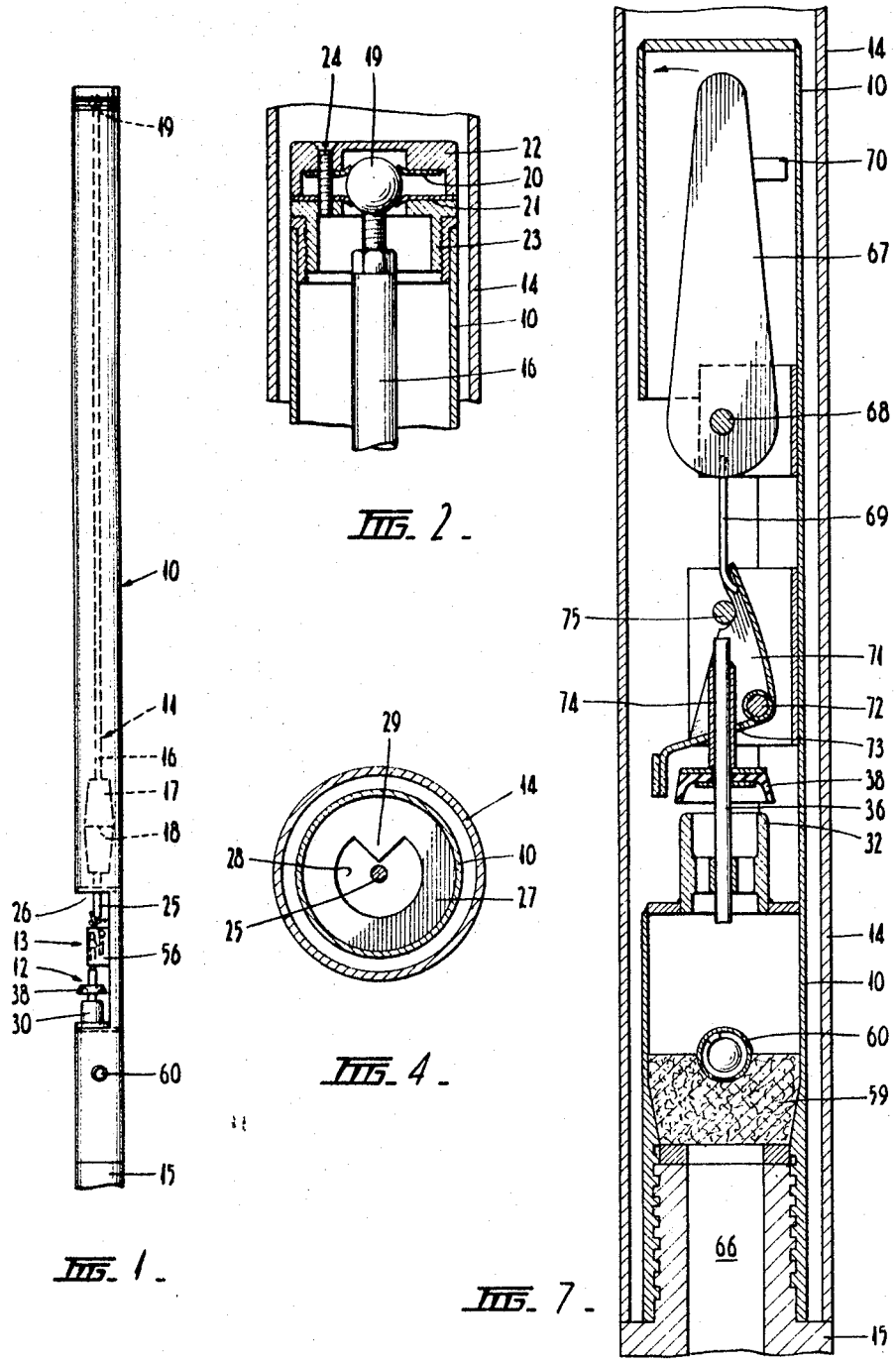

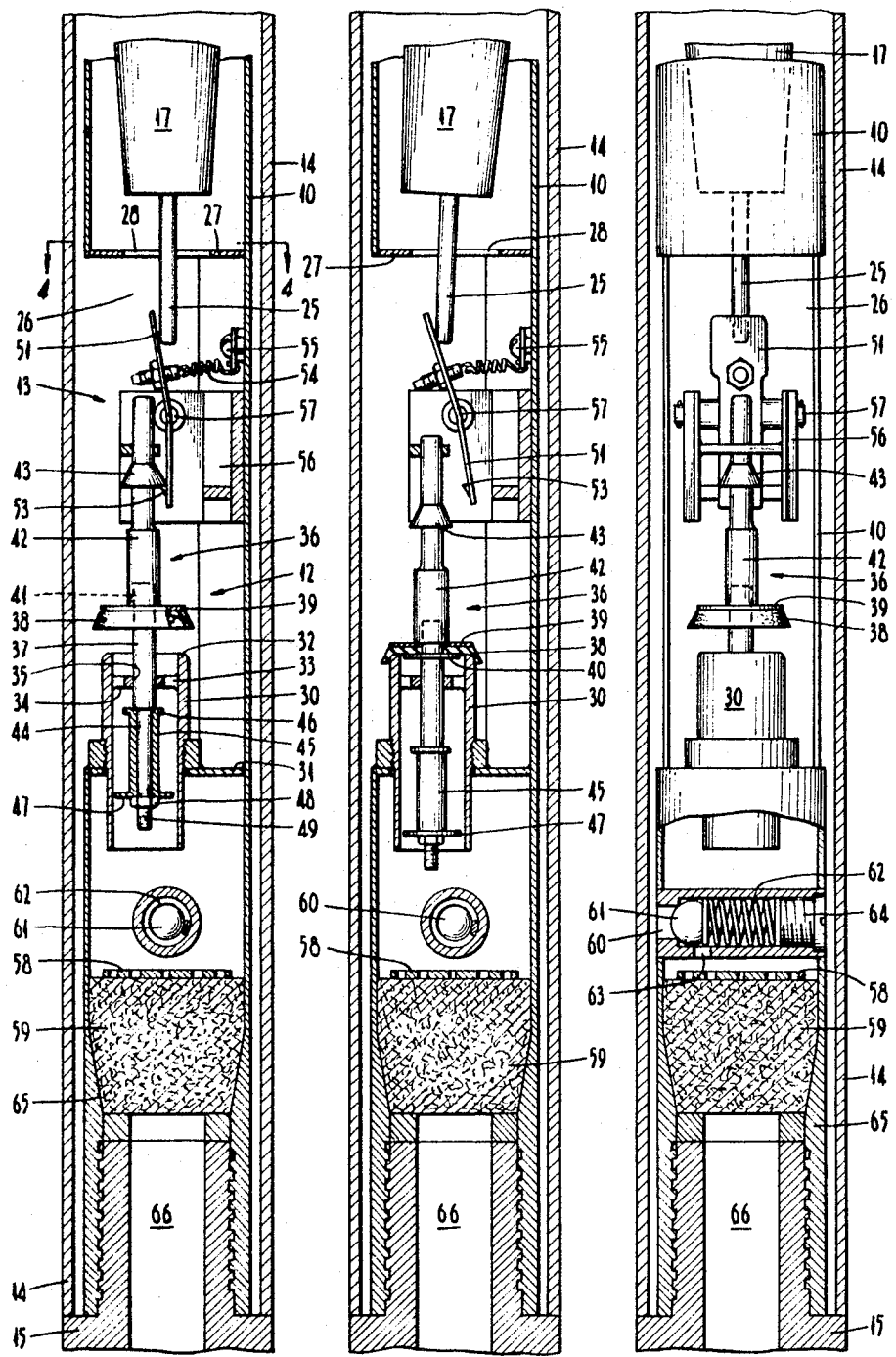

United States Patent Office 3,463,253
Patented Aug. 26, 1969

3,463,253
WEDGE ORIENTATION DEVICE
Edwin McInerney, Kalgoorlie, Western Australia, Australia, assignor to Western Mining Corporation Limited, Melbourne, Victoria, Australia, a company of Victoria
Filed Apr. 3, 1967, Ser. No. 627,849
Claims priority, application Australia, June 16, 1966, 7,024/66
Int. Cl. E21b 47/024; G01c 9/18
U.S. Cl. 175—45                                                9 Claims

ABSTRACT OF THE DISCLOSURE

An orientation device to be fitted adjacent a wedging device at the lower end of a drill train having a flow passage, a valve movable between two positions in one of which the passage is open and in the other it is closed and a pivotally mounted direction sensitive device having an extension which releases the valve to permit it to move from its open to its closed position. The components are arranged so that when the device moves to release the valve the wedge is correctly oriented and the operation is indicated at the head of the drill train by the increase in pressure of the fluid passage through the train.

---

This invention relates to an improved wedge orientation device and particularly to a device which causes a change in hydraulic pressure whereby the required alignment of a wedge can be determined.

The deflection of a bore hole by a wedge is of a relatively small order and thus unless the wedge is correctly oriented before the wedging operation commences, the correction achieved to the original bore hole can be minimal and, in some cases, it can cause deflection away from the desired direction.

The cost of wedging is relatively great. Even in the most efficient known method of wedging the time involved is some hours and in some methods it can take up to five shifts. Further, except under the most favorable circumstances, some bore holes can deflect through an angle which is such that the deflection can only just be corrected by wedging, so it is essential that the wedge be accurately oriented.

It can be seen that inefficient wedge orientation can cause a bore hole to either be deflected through an angle greater than can be corrected or, alternatively, can minimize the correction of bore hole deflections so that the hole cannot be brought to the required angle, thus causing a great deal of expense in that a hole, once it has reached this stage, must be abandoned.

Wedge orientation devices have been proposed but these have had limitations usually as to the depth at which they are effective and have not been satisfactory in all applications.

An object of the present invention is to provide a wedge orientation device which is accurate and which can be used through a wide range of depths.

The device of the invention includes a member which is sensitive to deflection of a bore hole which member cooperates with means whereby the flow of a liquid through the bore hole can be controlled whereby on correct orientation of the member the rate of flow and/or pressure of liquid being passed through the bore hole varies.

Preferably the member acts to restrict the flow down the drill rod and thus the pressure within the drill rod increases at the surface and at the position where such an increase is observed, the orientation of the device is determined.

Preferably means are provided whereby on the desired orientation being reached, an increased pressure flow can operate a by-pass means whereby the drilling liquid can be passed to the drill bit.

A device made in accordance with the invention has a great advantage in that regardless of the depth at which drilling is being done the measurement of pressure increase at the surface is relatively straightforward and thus the device can be used at any required depth.

In order that the invention may be more readily understood and put into practice, reference will be made to the accompanying drawings in which:

FIGURE 1 is an elevation of one form of device made in accordance with the invention with its outer casing removed.

FIGURE 2 is an enlarged sectional view of the upper end of the control device of the invention;

FIGURE 3 is a sectional elevation of the device showing the valve in its open position;

FIGURE 4 is a section along line 4—4 of FIGURE 3;

FIGURE 5 is a view similar to that of FIGURE 3 showing the valve in its closed position;

FIGURE 6 is a sectional elevation similar to that of FIGURE 3, but taken at right angles thereto; and, FIGURE 7 is a sectional elevation of an alternative form of the device of the present invention.

Referring to FIGURE 1, the device consists of three main components, all of which are enclosed in a portion of inner casing 10. These components comprise a direction sensitive device 11; a valve member 12; and a locking assembly 13. The whole assembly is located in an outer casing 14, which is part of the drill rod train and which is affixed at its lower end to an adaptor 15 which in turn is connected to the wedging device, not illustrated, with which the device is used.

The direction sensitive device 11 includes a spindle 16 carrying a weight 17, which weight has a maximum diameter portion 18 the use of which will be described hereafter.

At the upper end the spindle is provided with a ball 19 which is located between an upper ball seat 20 and a lower ball seat 21, which are carried in a swivel housing 22 and an end piece 23 respectively. The casing 22 is connected to the end piece 23 by means of screws 24 whereby the ball seats can be replaced if required. The lower end 25 of the spindle enters a cut-out portion 26 of the inner casing 10 and is adapted to operate the valve as described hereafter.

The larger diameter portion 18 of the weight 17 acts to give a bearing surface of this weight against the inner surface of the inner casing 10. This prevents the end 25 of the spindle from contacting the inner casing 10 and saves this end 25 from any damage. Between the weight 17 and the end 25, a guide plate 27 is located across the inner casing 10, the positioning of the guide plate being easy to see from examination of FIGURE 3 or FIGURE 5 and its formation being shown in FIGURE 4. The guide plate has an aperture 28 which is substantially circular apart from a segmental portion 29 extending therein.

The direction sensitive device 11 operates so that when the inner casing 10 is at any angle other than vertical, which is the condition illustrated in FIGURES 3 and 4, then the weight 17 will move towards the "low" side of the casing 10, the larger diameter portion 18 will contact the casing and the end 25 of the spindle will move from the central position towards the periphery of the circular cut-out 28 unless the segmental portion 29 is located on the "low" side. Assuming the segmented portion is not so located, rotation of the casing 10 will cause the weight 17 to move relatively about the inner periphery of the inner casing 10 until the end 25 of the spindle contacts the first edge of the segmental portion 29 and the spindle is caused to move towards the center of the aperture 28 to a position substantially as shown in FIGURE 4 and this movement actuates the locking device to be described hereafter.

The valve assembly 12 and the locking device 13 are each located in the cut-out portion 26 of the inner casing 10 previously referred to. Referring first to the valve assembly 12, this comprises a cylindrical body 30 extending upwardly from a plate 31 which closes the lower portion of the inner casing 10, the body 30 being provided with a valve seat 32 about its upper edge. The assembly 12 further comprises a plurality of apertures 33 formed in a spider 34 below the valve seat 32, the spider having a central aperture 35 which is adapted to receive the valve stem to be described hereafter. The particular arrangement of the body 30 and plate 31 can be varied depending upon the application.

The valve member comprises a stem 36 having a central portion 37 which is a close sliding fit in the aperture 35 and which carries a valve member 38 which may be a rubber boot having a supporting washer 39 on its upper surface and a second supporting washer 40 on its under surface. The central portion 37 of the valve stem may screw into a blind threaded aperture 41 in the upper portion 42 of the valve stem which carries a catch member 43 which will be further described hereafter. The lower portion 44 of the valve stem carries a shuttle piston 45 which has an enlarged upper portion 46 to limit the upward movement of the valve and a lower piston 47 which will be described more fully hereafter. The shuttle piston 45 is preferably held to the stem 36 by means of a nut 48 passing over the threaded lower end 49 of the spindle. The movement of the stem 37 is preferably also controlled by an aperture 35 in the spider 34, which aperture limits the radial movement of the stem.

Mounted between the valve stem and the lower end of the spindle is a lever arm 51 which has a central pivot 57, and a catch member 53 extending outwardly therefrom. This lever arm 51 is normally biased by a spring 54 which is mounted at one end by a screw 55 to the inner casing 10 and is adjustably connected to the arm 51 so that it is retained in the condition illustraated in FIGURE 3.

It can be seen that if the valve stem is moved upwardly, the catch member 43 on its upper end will tend to contact the catch member 53 on the lever 51 and cause the lever to move against the spring 54 until the catch member 43 is above the catch member 53 at which time the stem 36 will lock in the condition illustrated in FIGURE 3. It is maintained in this position by the relatively light pressure of the coil spring 54 on the lever arm 51.

If, however, lower end of the spindle 25 is moved to act against the upper arm of the lever 51, this will cause the lever to rotate about its pivot 57 to assume the condition illustrated in FIGURE 5 at which time the stem 36 will drop and the valve will close.

The lever 51 and its pivot 57 are carried on a subframe assembly 56 which is connected to the inner casing 10 by means of a pin 57. There is also provided and in order to remove the valve stem or the lever 51 it is necessary to remove the pin 57 and take the subframe assembly out through the open front 26 of the inner casing 10. If required, the body member 30 which carries the valve seat 32 can also be disconnected from the plate 31 so the whole operative portion of the device can be readily moved. Mounted below the plate 31 closing the inner casing 10 is a filter plug support 58 which retains a filter plug 59 in position and above the filter plug support 58 there is a ball valve which has an inlet aperture 60 opening to the space between the inner casing 10 and the outer casing 14; a ball 61 which is biased by a spring 62 so as to normally close this aperture and an outlet aperture 63 opening into the space between the filter plug support 58 and the plate 31. The ball and its associated spring are positioned through a plug 64 in the wall of the inner casing opposite aperture 60. The lower end of the inner casing 10 is provided with an adaptor unit 65 which connects to the adaptor 15 described previously.

In use the device is assembled at the lower end of a drill train with a wedging device connected to the adaptor 15; and before it is placed in the drill hole the wedging device is positioned at the desired orientation to the orientation device. The actual method of this positioning will be described briefly after the description of the operation of the device which should, in itself, make this matter clear.

The drill train is positioned in the bottom of the bore hole and the drilling water or other fluid which is used to lubricate the bit is passed down through the drill train and thus surrounds the whole of the valve assembly 12 and provided the valve is in its open position, as illustrated in FIGURE 3, this fluid will pass through the apertures 33, through the mesh 59, through aperture 66 to the bit. The return water then passes up outside the outer casing 14 to the bore head.

If the valve member 38 is seated on the valve seat 32, this flow cannot occur as there is no direct path through to the aperture 66 and thus there will be a pressure increase at the drill head.

As initially it is desired that the valve be opened, under these conditions the drill train is lifted and then lowered to near the bottom of the bore hole and under these circumstances there is a reverse water flow through the aperture 66 against the underside of shuttle piston 47 and against the underside of the valve member 38 through the apertures 33. This pressure causes the valve member to lift off its seat and because of the piston member 47, ensures a continuous upward movement of the valve member until the catch member 43 displaces the catch member 53 and the orientation device assumes the condition as illustrated in FIGURE 3. Thus, either the device is in this condition when it is first positioned at the bottom of the bore hole or, alternatively, it is caused to assume this condition. At this time, the drill train is slowly rotated, the large diameter portion 18 of the weight 17 rolls around the inside of the inner casing 10 and the lower end 25 of the spindle moves around the periphery of the aperture 28 in the plate 27 until it reaches the segment 29 at which time it is moved inwardly towards the center of the aperture 28 and at this time acts against the lever arm 51 causing the lower end of this lever arm to move outwardly so the catch 53 releases the catch 43 and the valve stem 36 drops and the valve member closes the valve seat, thus cutting off the water flow through the aperture 33 and there is an immediate increase in pressure at the bore head. This is the condition of orientation under normal circumstances, although there are exceptions to this which will be described hereinafter.

In order to check the condition, this position is marked, the drill train is again lifted and lowered, resetting the valve stem to the condition illustrated in FIGURE 3 and the rotation is again carried out and this operation is repeated until a satisfactory mean is achieved.

In order to commence the wedging operation, it is then only necessary to take whatever action is needed to lock the wedge, and in the wedge previously referred to a downward pressure on the drill train causes the shear pins to shear. Before drilling is commenced, the water pressure is increased and this increase in water pressure is sufficient to move the ball 61 from its seat so that a by-pass is achieved and water can be fed to the bit during drilling operations.

It was previously indicated that the closing of the valve indicated the required condition for wedging but should it be so desired the valve could be arranged to close at some position which necessitates a predetermined angular rotation of the drill rods before wedging occurs. Also, particularly if the bore hole is deep then the drill rods may twist and it is essential to take precautions to ensure that any twist is removed before wedging occurs. Such actions are well-known to persons skilled in the art and will not be described further.

Also, although we have described the specific embodiment basically for drilling holes just slightly off-vertical, it can be seen that wedging can occur at any desired angles and in some operations, such as prospecting where a particular mineral load is being examined, it is often desired to drill almost horizontally to examine the width of the load and the orientation device can be used for wedging at angles approaching horizontal.

A modified form of the device is illustrated in FIGURE 7 and we shall now describe this form of device very briefly. The spindle arrangement of the previous modification is replaced by a weight 67 which is mounted on a pivot 68 and which has a downwardly directed trigger arm 69. A stop member 70 is provided to limit the movement of the weight in one direction.

Instead of the lever arm arrangement as in the previous embodiment, there is provided a bell crank member 71 which is mounted on a pivot 72 and which has an aperture 73 through which the stem 36 of the valve passes, the stem having a metallic sheath 74. A stop member 75 is provided to limit movement of the valve crank arm 71 and the arm 71 has a weight 76 which normally holds the valve crank arm against the stop 75 and which arrangement causes the valve stem 34 to be locked.

In this arrangement the valve member 38 can be spaced from its seat 32 in a manner similar to that described with relation to the other embodiment and the arrangement of the bell crank arm 71 will keep the valve open until on rotation of the casing the weight 67 moves in the direction of the arrow, causing movement of the bell crank member 71 by the trigger arm 69, releasing the valve and causing it to drop.

This particular arrangement is slightly simpler than the embodiment previously described, but has a certain disadvantage in that grit entering the aperture 73 can prevent free movement of the valve stem 36 relative thereto, and also can cause undesirable wear on the components. Notwithstanding this in applications where there is relatively little grit, extremely satisfactory results can be obtained from this embodiment.

Operation of the embodiment is effectively identical to that previously described, and will not be further described.

The setting up of the device of either of the embodiments can, no doubt, be readily understood without further description in the light of the operation, but in practice, the arrangement is located and fluid is passed downwardly whilst the device is rotated and until the valve closes. If initially, there is no fluid flow, fluid is simply connected to the lower end of the device to cause the valve to open at which time it is connected to the other end of the device which is rotated until the valve closed position is obtained, at which time the wedge assembly can be connected thereto in the required orientation.

In the particular embodiments described, the orientation occurs when the pressure at the bore head increases but it is to be understood that the device could equally well be arranged to operate in the opposite direction so that the pressure drops when orientation occurs.

I claim:

1. An orientation device for attachment to a train of drill rods of the type wherein fluid flows therethrough, and comprising
 a pivotally mounted weighted member mounted in such a manner that a turning moment occurs when a required and predetermined angular orientation is achieved;
 a spindle extending from said weighted member, said spindle and said weighted member being so associated that they move under the action of said moment thereby forming direction sensitive means;
 a valve member located in the flow path of the fluid through said drill train, said member being controllable by said spindle and having two basic positions to control the fluid flow whereby the flow rate and/or pressure of the fluid can vary;
 a plate having a valve seat formed therein, said plate and valve seat serving to obstruct the flow of fluid from the drill train to which the device is connected to the bottom of the associated bore hole; and
 a plurality of apertures formed within the confines of said valve seat for enabling fluid connection between the sides of said plate.

2. A device as claimed in claim 1 wherein there is provided a pressure by-pass valve whereby liquid under a pressure at least equal to a predetermined minimum can flow from the bore head to the bottom of the bore hole even if the valve is closed.

3. A device as claimed in claim 2 wherein the valve seat encloses an axial bearing and wherein the valve member includes a stem, the lower end of which is journalled in the bearing and a closure member mounted on the stem partway along its length.

4. A device as claimed in claim 3 wherein the valve member also includes a lock means which is adapted to hold the closure member away from the seat, the lock means being operable by the direction sensitive means to release the valve member on the device reaching the predetermined angular position.

5. A device as claimed in claim 4 wherein the lock means includes a catch on the valve stem above the closure member and a lever carrying a complementary catch which is normally biased as to engage the catch of the valve member but which is movable on actuation by the direction sensitive member.

6. A device as claimed in claim 5 wherein the lever bias is by means of a spring and wherein the lever is of such a length as to extend into the path of the spindle which on movement moves the lever against its spring thereby releasing the catch.

7. A device as claimed in claim 4 wherein the lock means includes a pivotally mounted bell crank member having an aperture in one of its arms which is pivoted over the valve stem, the bell crank member being so biased that the sides of the aperture normally contact the stem and hold the valve member against movement.

8. A device as claimed in claim 7 wherein another arm of the bell crank member extends into the path of the spindle which on movement partially rotates the bell crank member freeing the valve stem.

9. A method of aligning a train of drill rods having a drill bit at their lower end and an orientation device adjacent the bit, the orientation device having a direction sensitive means controlling a valve, the method comprising the steps of:
 positioning the drill train and the associated bit and orientation device in the bottom of a drill hole;
 passing drilling fluid through the drill train, through the valve which is open to the bit and then to the surface around the drill train;
 rotating the drill train until it reaches the required angular position at which the direction sensitive means permits the valve to close;
 reading a parameter of fluid flow at the surface; and
 increasing the fluid pressure to actuate a bypass valve in the orientation device.

References Cited

UNITED STATES PATENTS

| 1,854,208 | 4/1932 | Lynch et al. | 175—45 |
| 2,046,956 | 7/1936 | Lynch et al. | 175—45 |
| 3,077,233 | 2/1963 | Armstrong | 175—45 |
| 3,122,213 | 2/1964 | Hawk | 175—45 |

CHARLES E. O'CONNELL, Primary Examiner

RICHARD E. FAVREAU, Assistant Examiner

U.S. Cl. X.R.

33—205